United States Patent
Harrington et al.

(10) Patent No.: US 9,338,023 B2
(45) Date of Patent: May 10, 2016

(54) SITE-TO-SITE 6RD TUNNELING USING COLLOCATED BORDER ROUTER AND CUSTOMER EDGE

(75) Inventors: Kendra S. Harrington, Bainbridge Island, WA (US); Allen J. Huotari, Garden Grove, CA (US)

(73) Assignee: Cisco Technology, Inc., San Jose, CA (US)

( * ) Notice: Subject to any disclaimer, the term of this patent is extended or adjusted under 35 U.S.C. 154(b) by 682 days.

(21) Appl. No.: 13/591,360

(22) Filed: Aug. 22, 2012

(65) Prior Publication Data

US 2014/0056308 A1    Feb. 27, 2014

(51) Int. Cl.
*H04L 12/28* (2006.01)
*H04L 12/46* (2006.01)
*H04L 12/56* (2006.01)
*H04L 12/715* (2013.01)

(52) U.S. Cl.
CPC ........ *H04L 12/2859* (2013.01); *H04L 12/4633* (2013.01); *H04L 45/741* (2013.01); *H04L 45/04* (2013.01)

(58) Field of Classification Search
USPC ........................................ 370/401, 390, 392
See application file for complete search history.

(56) References Cited

U.S. PATENT DOCUMENTS

| | | | |
|---|---|---|---|
| 2004/0240468 A1* | 12/2004 | Chin et al. | 370/466 |
| 2006/0209885 A1 | 9/2006 | Hain et al. | |
| 2008/0205401 A1 | 8/2008 | Mirtorabi et al. | |
| 2009/0016270 A1* | 1/2009 | Tsirtsis (Georgios) et al. | 370/328 |
| 2010/0085977 A1 | 4/2010 | Khalid et al. | |
| 2011/0286470 A1 | 11/2011 | Dec et al. | |
| 2012/0182994 A1* | 7/2012 | Dec et al. | 370/392 |
| 2012/0218998 A1* | 8/2012 | Sarikaya | 370/390 |
| 2013/0028163 A1 | 1/2013 | Hsiao et al. | |

OTHER PUBLICATIONS

Despres, R., "IPv6 Rapid Deployment on IPv4 Infrastructures (6rd)", Request for Comments 5569, Internet Engineering Task Force Trust, Jan. 2010, 10 pages.
Townsley, et al., "IPv6 Rapid Deployment on IPv4 Infrastructures (6rd)—Protocol Specification", Request for Comments 5969, Internet Engineering Task Force Trust, Aug. 2010, 18 pages.

* cited by examiner

*Primary Examiner* — Omar Ghowrwal
*Assistant Examiner* — Angel Brockman
(74) *Attorney, Agent, or Firm* — Parker Ibrahim & Berg LLC; James M. Behmke; Stephen D. LeBarron

(57) ABSTRACT

In one embodiment, a router gateway in a first Local Area Network (LAN) hosts both an Internet Protocol version 6 (IPv6) Rapid Deployment (6rd) Customer Edge (CE) as well as a 6rd Border Router (BR). In one specific example embodiment, upon registering the BR to a global computer network, the router gateway may then accept a 6rd tunnel from a device hosting a second 6rd CE of a second LAN, such that the 6rd tunnel joins the first and second LANs into a single LAN. The second CE may then communicate, via the router gateway, between the first and second LANs as a single LAN (e.g., site-to-site), accordingly.

22 Claims, 10 Drawing Sheets

SITE-TO-SITE 6RD TUNNELING USING COLLOCATED BORDER ROUTER AND CUSTOMER EDGE

TECHNICAL FIELD

The present disclosure relates generally to computer networks, and, more particularly, to IPv6 Rapid Deployment (6rd) tunneling.

BACKGROUND

As users grow and mature in their Internet knowledge and experience, they begin to realize that any given home network can be part of "the cloud". However, site-to-site (e.g., home-to-home) connectivity using IPv4 can be problematic because it inherently suffers from private address collisions. Furthermore, the setup of a tunnel is difficult for most end users.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a router gateway in a first Local Area Network (LAN) hosts both an Internet Protocol version 6 (IPv6) Rapid Deployment (6rd) Customer Edge (CE) as well as a 6rd Border Router (BR). In one specific example embodiment, upon registering the BR to a global computer network, the router gateway may then accept a 6rd tunnel from a device hosting a second 6rd CE of a second LAN, such that the 6rd tunnel joins the first and second LANs into a single LAN. The second CE may then communicate, via the router gateway, between the first and second LANs as a single LAN (e.g., site-to-site), accordingly.

DESCRIPTION

A computer network is a geographically distributed collection of nodes interconnected by communication links and segments for transporting data (e.g., voice, video, and/or data) between end nodes, such as personal computers and workstations, or is other devices, such as sensors, etc. Many types of networks are available, ranging from Local Area Networks (LANs) to Wide Area Networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, Synchronous Optical Networks (SONET), Synchronous Digital Hierarchy (SDH) links, etc.

Figure 1:
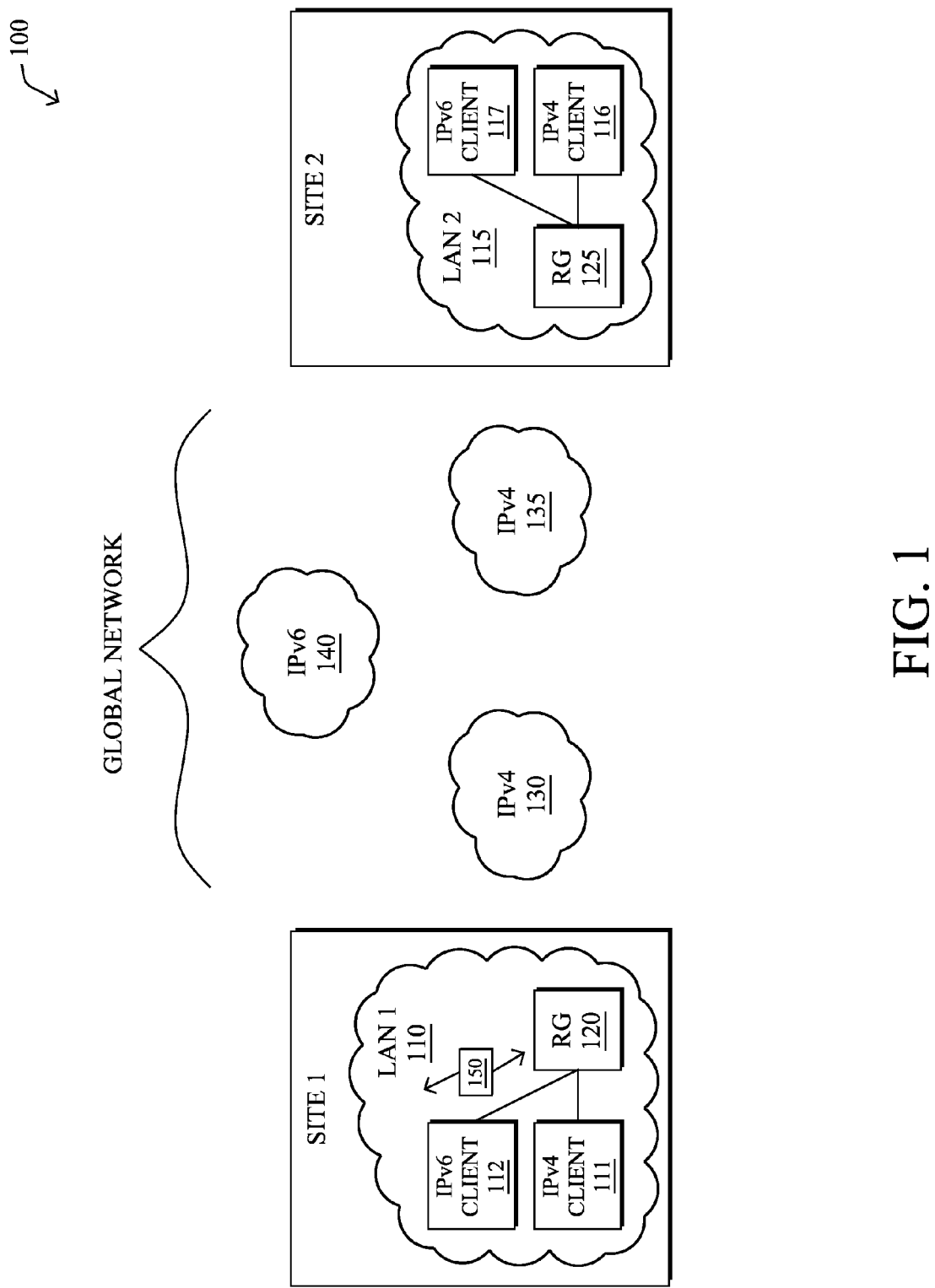
FIG. 1 illustrates an example computer network.

FIG. 1 is a schematic block diagram of an example computer network 100 illustratively comprising various sites (e.g., homes, schools, businesses, etc.), such as LAN 1 (110) and LAN 2 (115) separated by a global network (e.g., the Internet), which may consist of one or more individual networks, such as IPv4 networks 130 and 135, as well as IPv6 networks 140, as will be appreciated by those skilled in the art. The sites themselves may comprise one or more Customer-Premises Equipment (CPE, also Customer-Provided Equipment) devices, such as router gateways 120 (LAN 1) and 125 (LAN 2) that interconnect with and transition between local (e.g., customer) networks and the global (e.g., provider) networks, thus providing access to those networks for various devices located within the local networks, such as IPv4 devices 111/116 and/or IPv6 devices 112/117 (note that devices may be both IPv4 and IPv6, and the view shown is not meant to be limiting). Those skilled in the art will understand that any number of nodes, devices, links, etc. may be used in the computer network, and that the view shown herein is for simplicity. Also, those skilled in the art will further understand that while the network is shown using a certain device naming convention, the network 100 and the device names are merely an example illustration that is not meant to limit the disclosure.

Note that the links between the devices may be wired links or shared media. Data packets (or frames) 150 may be exchanged among the nodes/devices of the computer network 100 over the links using predefined network communication protocols such as certain known wired protocols, wireless protocols, or other protocols where appropriate. In this context, a protocol consists of a set of rules defining how the nodes interact with is each other. In general, the connections to/from and between the IPv4 and IPv6 networks of the global network are implied without being specifically shown within the figures.

Figure 2:
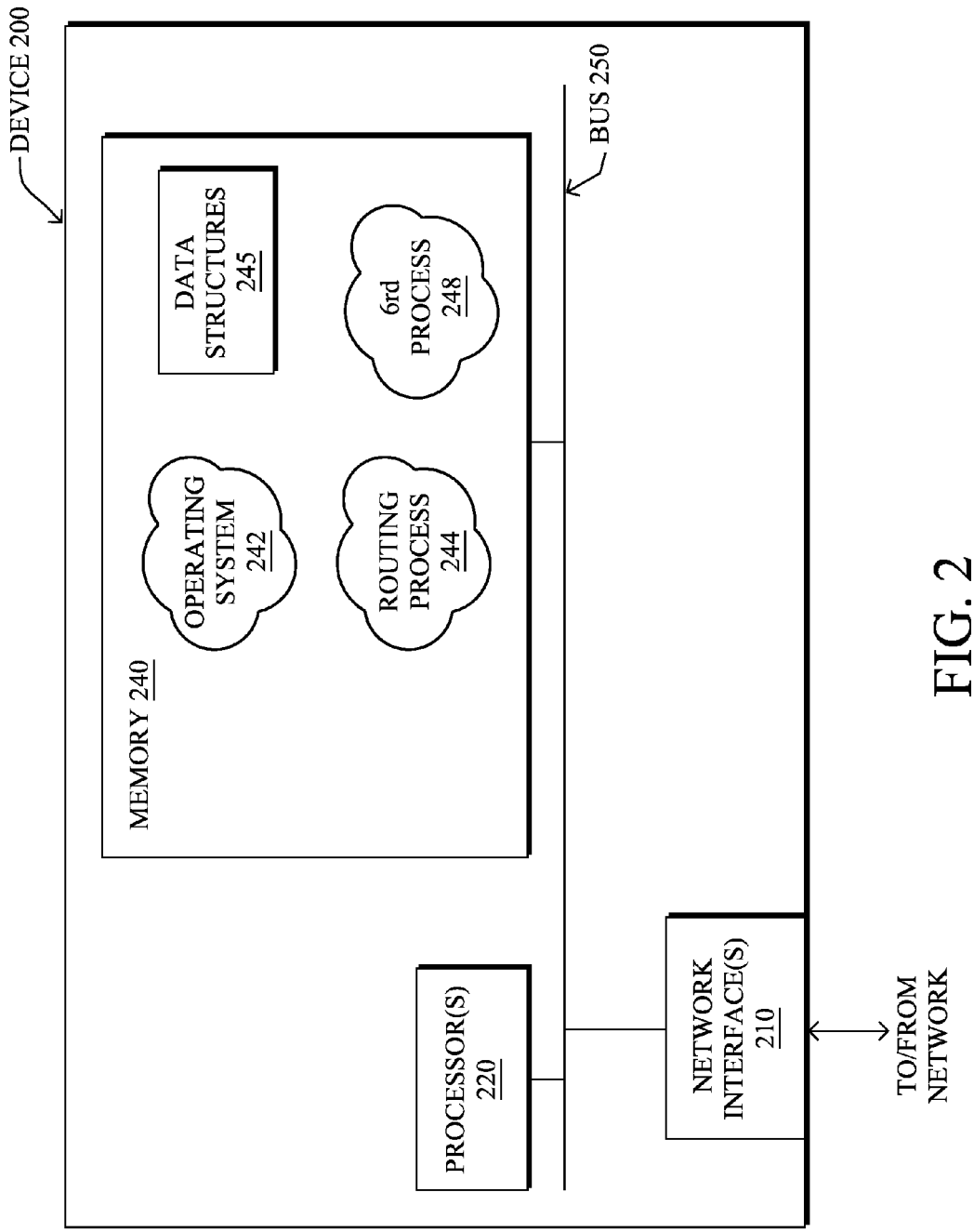
FIG. 2 illustrates an example network device/node.

FIG. 2 is a schematic block diagram of an example node/device 200 that may be used with one or more embodiments described herein, e.g., particularly as router gateway devices 120 and/or 125 or any other suitable device as described herein. The device may comprise one or more network interfaces 210 (e.g., wired, wireless, etc.), at least one processor 220, and a memory 240 interconnected by a system bus 250.

The network interface(s) 210 comprise the mechanical, electrical, and signaling circuitry for communicating data over links coupled to the network 100. The network interfaces may be configured to transmit and/or receive data using one or more communication protocols. Note, further, that the devices may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or logic elements adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may illustratively comprise routing process 244 (e.g., customer edge and/or border router functionality as described herein) and an illustrative "6rd" process 248 as also described herein. Note that while the processes are shown in centralized memory 240, alternative embodiments provide for one or more of the processes to be specifically operated within the network interfaces 210.

It will be apparent to those skilled in the art that other processor and memory types, including various computer-readable media, may be used to store and execute program instructions pertaining to the techniques described herein. Also, while the is description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes (e.g., 6rd process 248 may be a component of routing process 244).

Routing process 244 comprises computer executable instructions executed by the processor 220 to perform functions provided by one or more routing protocols, such as in accordance with IPv4 and/or IPv6 routing protocols as will be understood by those skilled in the art. These functions may be configured to manage a routing/forwarding table (a data structure 245) containing, e.g., data used to make routing/forwarding decisions. For example, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR), also referred to as Interior (or Internal) Gateway Protocols (IGPs), as well as the known Border Gateway Protocol (BGP). In particular, as described herein, routing process 244 may comprise one or both of a customer edge (CE) functionality and a border router (BR) functionality, each as may be generally appreciated by those skilled in the art, and as enhanced according to the techniques described herein.

Increasingly, network operators offer IPv6 and IPv4 data services to their (external or internal) subscribers by not only using a dual-stack network, but also by using tunneling or translation (or both) through their v4 or v6 or dual-stack networks. In addition, tunneling or translation options are increasingly being used as "IPv6 Transition" or "IPv4 Address Exhaust" options, such as, for example:

1. IPv6 Rapid Deployment or "6rd" (6over4 tunnel mode);
2. IPv4 Residual Deployment encapsulation or "4rd-e" (4over6 tunnel mode);
3. Dual stateless IPv4/IPv6 translation or "dIVI" (4via6 translation mode);
4. Lightweight address family transition for IPv6 or "laft6" (4via6 translation mode); and
5. 4rd translation or "4rd-t" (4via6 translation mode).

Figure 3A:
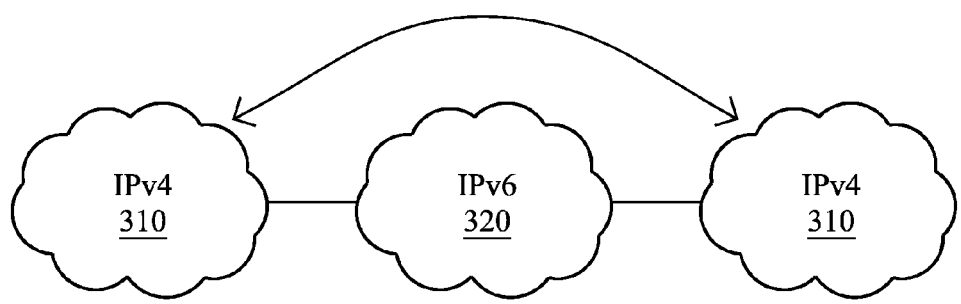
FIGS. 3A-3B illustrate simplified examples of IPv6 transition.
Figure 3B:
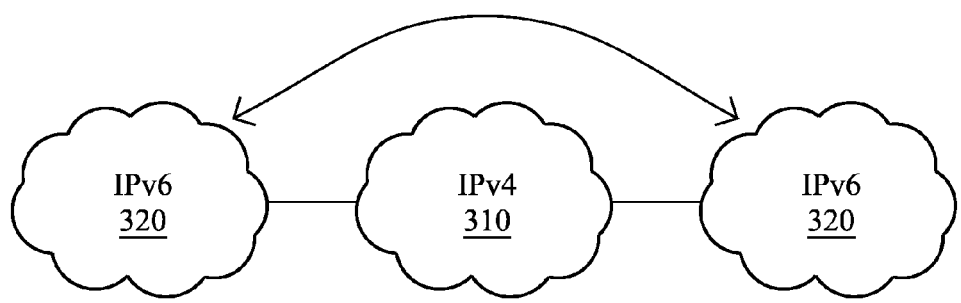

For example, FIGS. 3A-3B illustrate simplified examples of IPv6 transition generally, where in FIG. 3A two IPv4 networks 310 communicate over an IPv6 network 320, while FIG. 3B illustrates two IPv6 networks 320 separated by an IPv4 network 310. As such, a selected one of the above-mentioned IPv6 transition options may be used to tunnel over the intermediate network, or else translate between the different networks, accordingly. Generally, all of the above IPv6 transition options require a set of related configuration parameters at the CPEs as well as border/relay routers.

As noted above, any given network can be part of "the cloud". However, site-to-site (e.g., home-to-home) connectivity using IPv4 can be problematic because it inherently suffers from private address collisions. As also noted, the setup of a tunnel is difficult for most end users.

The techniques herein provide for site-to-site (e.g., home-to-home) connectivity by hosting a router gateway with 6rd Customer Edge (CE) and 6rd Border Router (BR) capability (note that IPv6 typically will not suffer from address collisions). In particular, the techniques herein locate a 6rd BR in the local (home) router and collocate that 6rd BR with a 6rd customer edge CE functionality, thus simplifying site-to-site remote access. Specifically, according to one or more embodiments of the disclosure as described in detail below, a router gateway in a first LAN hosts both a 6rd CE as well as a 6rd BR. In particular, in one example embodiment, the router gateway may accept a 6rd tunnel from a device hosting a second 6rd CE of a second LAN, such that the 6rd tunnel joins the first and second LANs into a single LAN. The second CE may then communicate, via the router gateway, between the first and second LANs as a single LAN (e.g., site-to-site), accordingly.

Illustratively, the techniques described herein may be performed by hardware, software, and/or firmware, such as in accordance with the "6rd" process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, and as such, may be processed by similar components understood in the art that execute those protocols, accordingly.

Operationally, in order to setup a 6rd tunnel, an end user currently needs the following information in order to configure a 6rd CE:

1. 6rd Prefix (e.g., 2001:55c);
2. 6rd prefix length (e.g., 32);
3. 6rd BR Fully Qualified Domain Name (FQDN) (e.g., 6rd.example-domain-name.net); and
4. IPv4 mask length (e.g., 0).

This information is needed in order to point a 6rd CE at a 6rd BR. According to the techniques herein, however, a site's router gateway hosts not only a 6rd CE but also a 6rd BR. Furthermore, in one embodiment, if a 6rd BR registers this information (e.g., via a service record in a Dynamic Domain Name Service (DDNS)) and the FQDN is something generally straightforward and shared between user of the different sites (e.g., family/friends), such as "www.family-domain-name.com", then this information can be easily retrieved and autoconfigured using an ordinary IPv4 connection from a site/home router gateway in order to provide remote access or, as has been colloquially termed, a "Virtual Family Network" (VFN). (Notably, the FQDN need not be straightforward, and may in certain embodiments be an IP address and not a name.)

Figure 4:
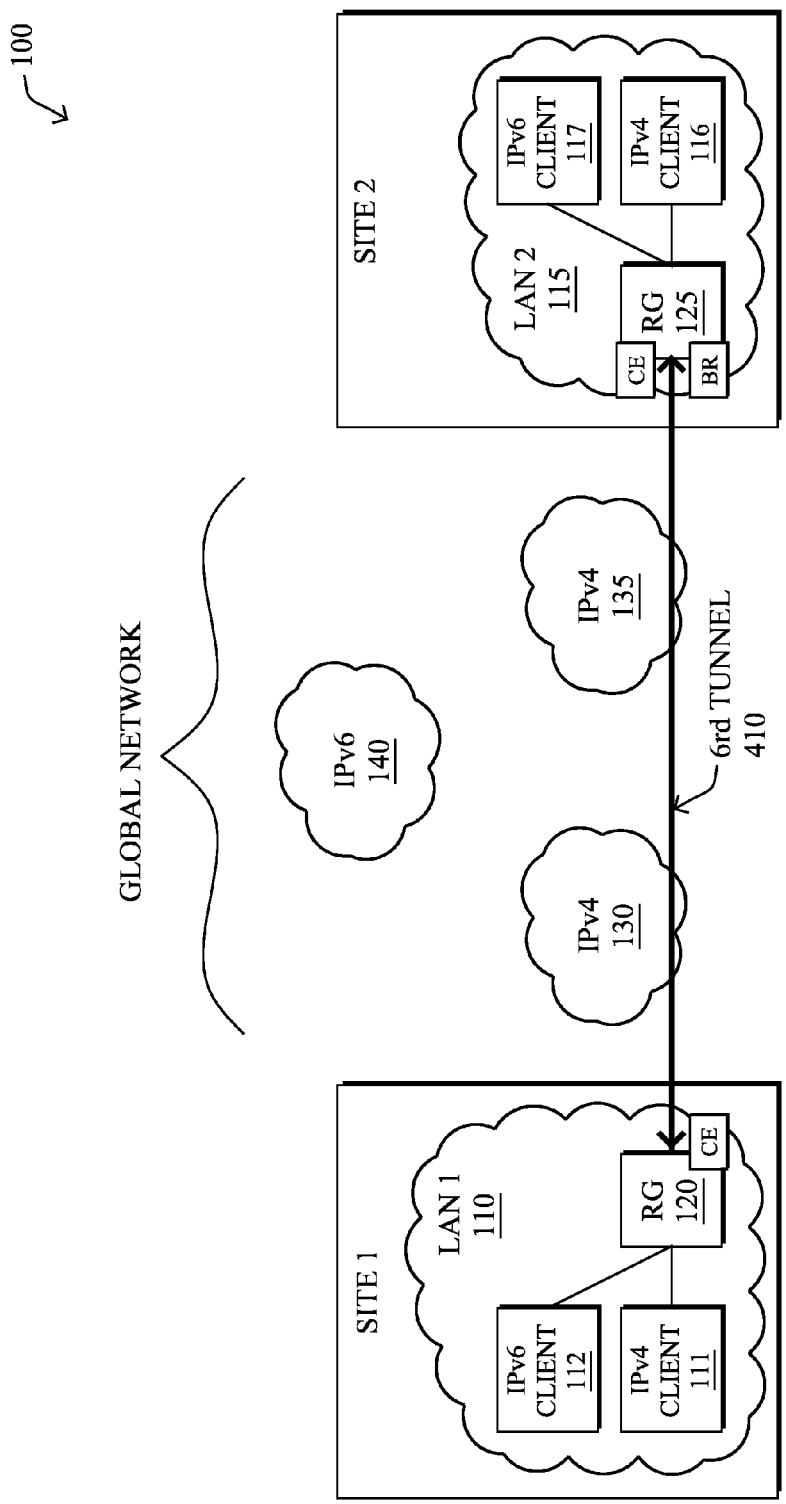
FIGS. 4-8 illustrate example views of site-to-site communication in accordance with one or more embodiments herein.

FIG. 4 illustrates a simplified example of site-to-site (e.g., home-to-home) connectivity, where the router (RG) 120 in LAN/site 1 (e.g., hosting a 6rd CE) has determined (e.g., acquired) the registered 6rd configuration information from the global computer network (e.g., the cloud) as described above. Once the 6rd CE functionality within the router gateway 120 in LAN/site 1 has the 6rd BR information for the router gateway 125 in LAN/site 2 the tunnel can be automatically established. Now IPv6 clients 112 in LAN/site 1 can communicate directly with IPv6 clients 117 in LAN/site 2, since the accepted 6rd tunnel joins the first and second LANs into a single LAN at the CE/BR is router gateway 125.

Specifically, in the example use case in FIG. 4, where tunnel 410 is active, assume that the BR in LAN/site 2's RG provides a unique-local address (ULA) for the IPv6 clients 112 in LAN/site 1, as well as the IPv6 clients 117 in LAN/site 2. IPv6 Clients in LAN 1 can thus communicate with IPv6 clients in LAN 2 as if they were on the same LAN. Note that in this example, neither site 1 nor site 2 will use IPv6 to communicate with the global network (e.g., cloud/Internet), instead using only IPv4 communication (e.g., RG 120 is connected only to IPv4 network 130). Note further that the CE/BR router gateway 125 in LAN/site 2 can also support a "back-to-back" 6rd BR/6rd CE, and can thus provide routing capability for services provided to site 2 to be forwarded to site 1. For example, this may be the case in a "vacation house" scenario where a user that legitimately has rights to services in site 2 happens to be in site 2 (e.g., the vacation house).

Figure 5:
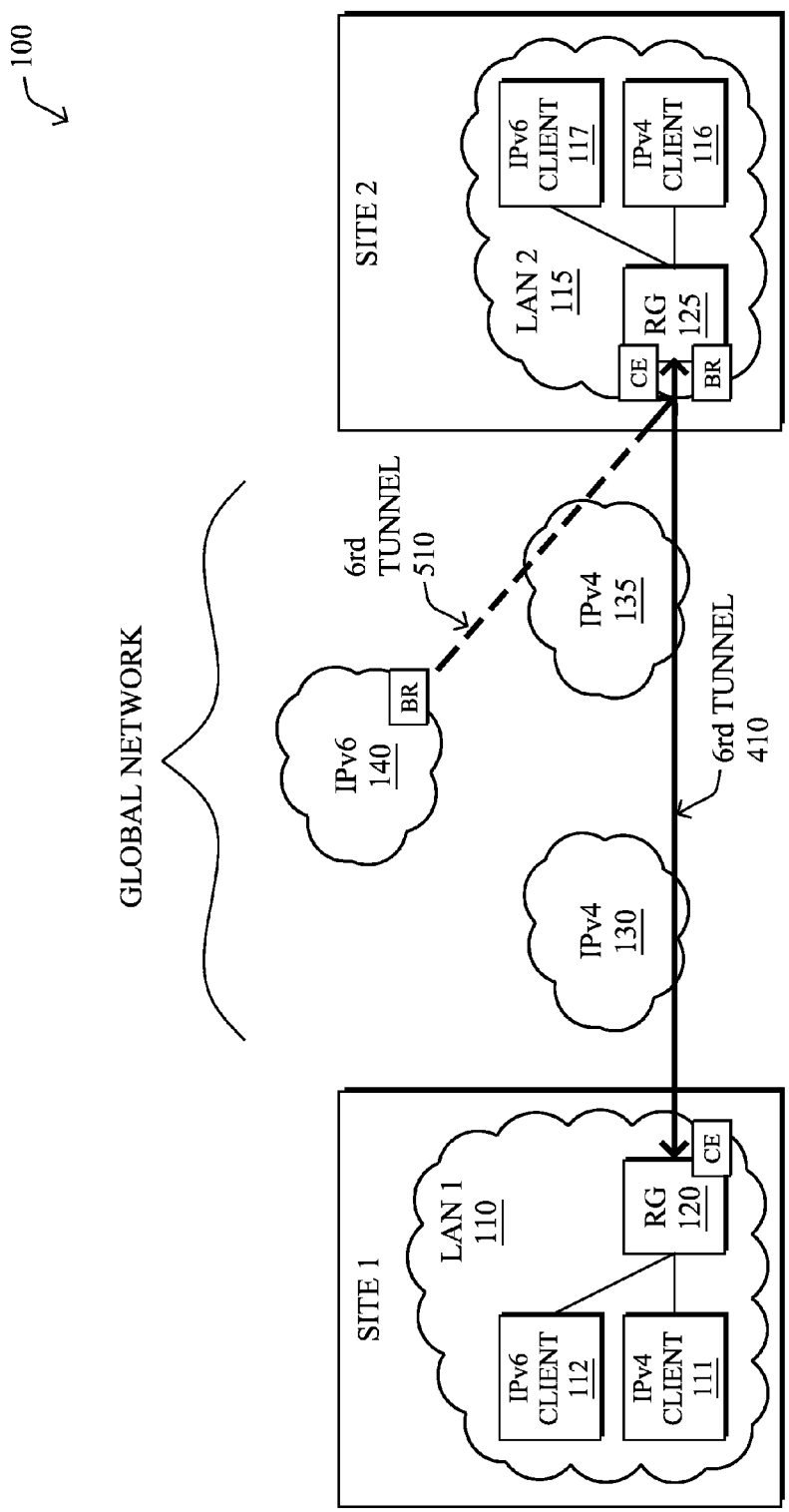

Conversely, in the use case shown in FIG. 5, an additional 6rd tunnel 510 is established to the IPv6 global network 140, where the additional 6rd tunnel provides access to the IPv6 global network for the router gateway 125 and devices of LAN 2. By concatenating the 6rd tunnel 410 and additional 6rd tunnel 510, access may thus be provided to the IPv6 global network 140 for the router gateway 120 and any devices of LAN 1 (i.e., LAN 1 communicates with the IPv6 global network 140 over the 6rd tunnel 410 and then over the additional 6rd tunnel 510 via the router gateway 125).

In particular, as shown in FIG. 5, tunnels 410 and 510 are active, and the CE function in LAN/site 2's RG 125 connects to the BR in the IPv6 cloud 140, and provides IPv6 Global Unicast Addresses (GUAs) to the IPv6 clients 117 in site 2. The BR in site 2's RG 125 provides that same GUA prefix to the IPv6 clients 112 in LAN/site 1. IPv6 clients 112 in site 1 can then communicate with IPv6 clients 117 in site 2 as if they are on the same LAN, and both site 1 and site 2 IPv6 clients can use IPv6 to communicate with the IPv6 cloud 140, through site 2's RG 125. Note that if 6rd tunnel 410 is disconnected, clients in LAN/site 1 may revert to their IPv4 addresses for communication with the cloud (via IPv4 network 130).

Figure 6:
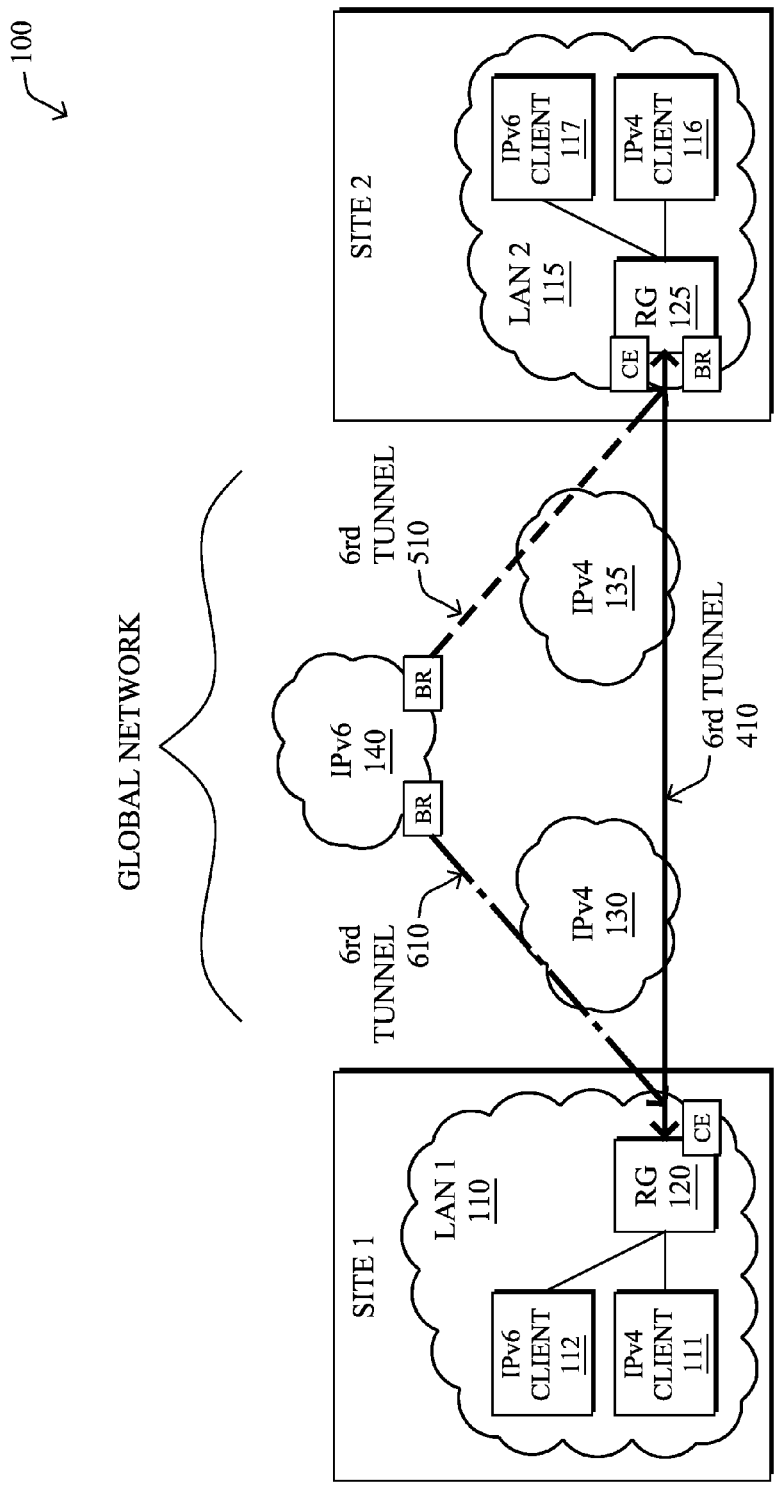
Figure 7:
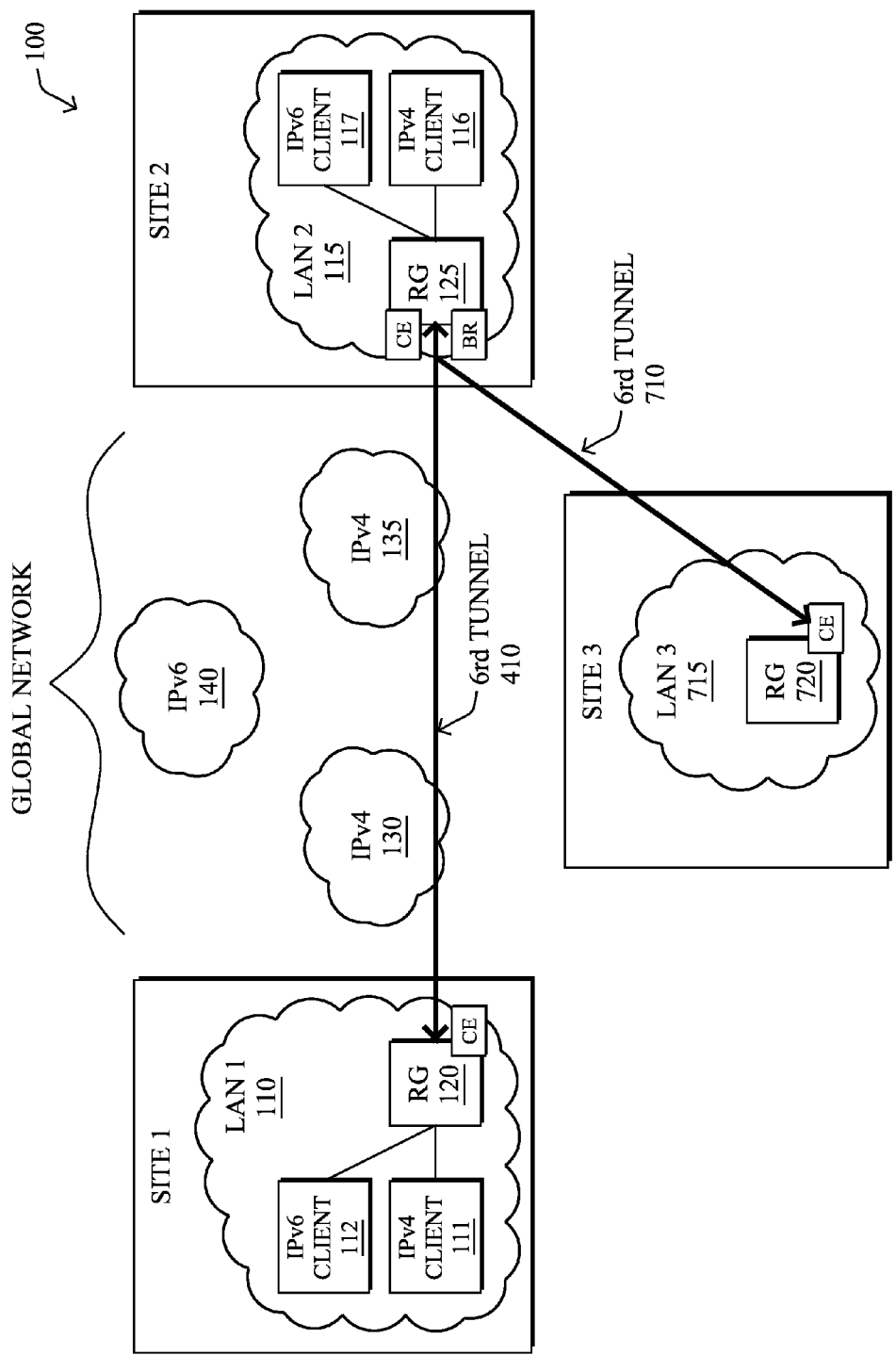

A third use case is shown in FIG. 6, where an additional 6rd tunnel 610 is also established from the CE router gateway 120 of LAN/site 1 to the IPv6 global network 140. For instance, now tunnels 410, 510, and 610 are active, and both site 1 and site 2 have independent active IPv6 connections to the cloud 140, with GUAs assigned to each IPv6 client. In this arrangement, IPv6 clients 112 in LAN/site 1 can still communicate with IPv6 clients 117 in LAN/site 2 as if they were on the same LAN. (Note that a portion of FIG. 6 may be used to illustrate how IPv6 CE/BR connections operate in conventional networks today; namely where tunnel 610 functions as the connection between the CE of RG 120 in LAN 1, while the BR for the RG 120 is located within the IPv6 cloud 140.)

In still another use case according to one or more additional embodiments herein, an additional 6rd tunnel 710 may be established from the CE/BR router gateway 125 in site 2 to a third device, e.g., another CE router gateway 720 in LAN/site 3 (715). By accepting this additional 6rd tunnel 710, and concatenating it with the 6rd tunnel 410, LAN/sites 1, 2, and 3 may be joined into a single LAN. Note that in this situation, the router gateway 125 in site 2 may be configured with one or more policies regarding pass-through permissions between LAN 1 and LAN 3 (e.g., and LAN 2), such as allowing certain connections but not others, etc.

Figure 8:
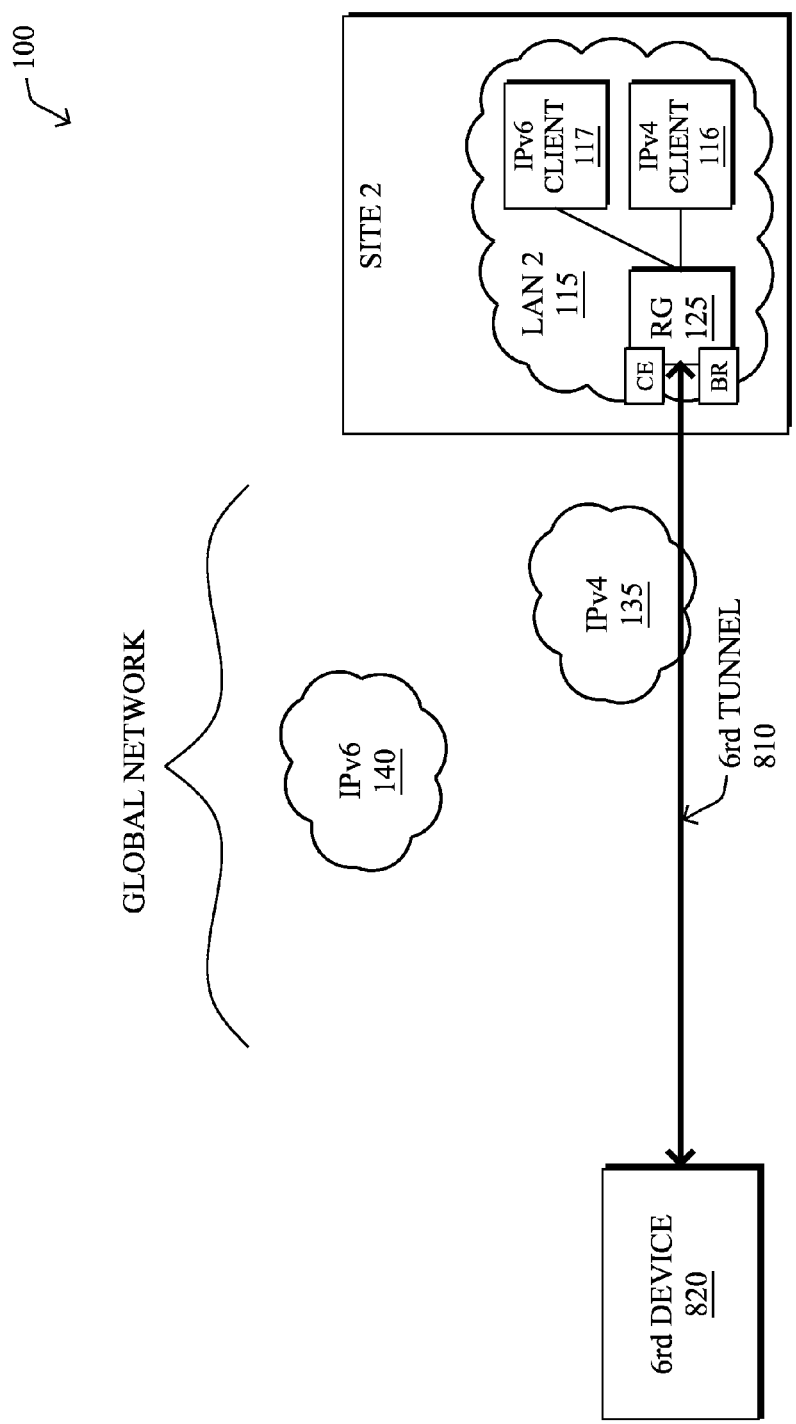

In a last illustrative use case, FIG. 8 demonstrates an alternative embodiment where the established 6rd tunnel 810 (rather than 410) may be with a remote 6rd-capable device. That is, tunnel 810, established in generally the same manner as tunnel 410 above, may interconnect any remote 6rd device 820 with the CE/BR router gateway 125 in site 2, thus joining the device 820 with LAN/site 2. Note that the additional embodiments above may also be applied to the device 820, such as concatenating tunnel 810 with other 6rd tunnels, etc.

The techniques herein thus locate a 6rd BR in a home/site in a manner that was not anticipated by the developers of 6rd. That is, according to the techniques herein, using 6rd tunnels (e.g., 410) to connect multiple RGs and create a private, secure, temporary or permanent connection between two disparate networks (or between a is remote device and a network) is an unexpected use of a 6rd tunnel. In addition, routing between tunnel 510 and tunnel 410 provides even more benefit by allowing IPv6 clients in site 1 to communicate via IPv6 even though site 1 does not have its own IPv6 connection to the cloud.

Note that the IPv4 clients in both site 1 and site 2 may still have difficulty connecting and sharing services if they are on the same subnet, as there may be IP address conflicts. Though the techniques herein do not attempt to solve this problem, and the conventional solutions (e.g., changing the IPv4 subnet in one RG) remain the same, the prevalence of IPv6 in clients that are likely to be content sinks and content sources (e.g., newer PC operating systems, mobile devices, TVs, etc.) minimizes the effect this issue will continue to have on users.

Figure 9:
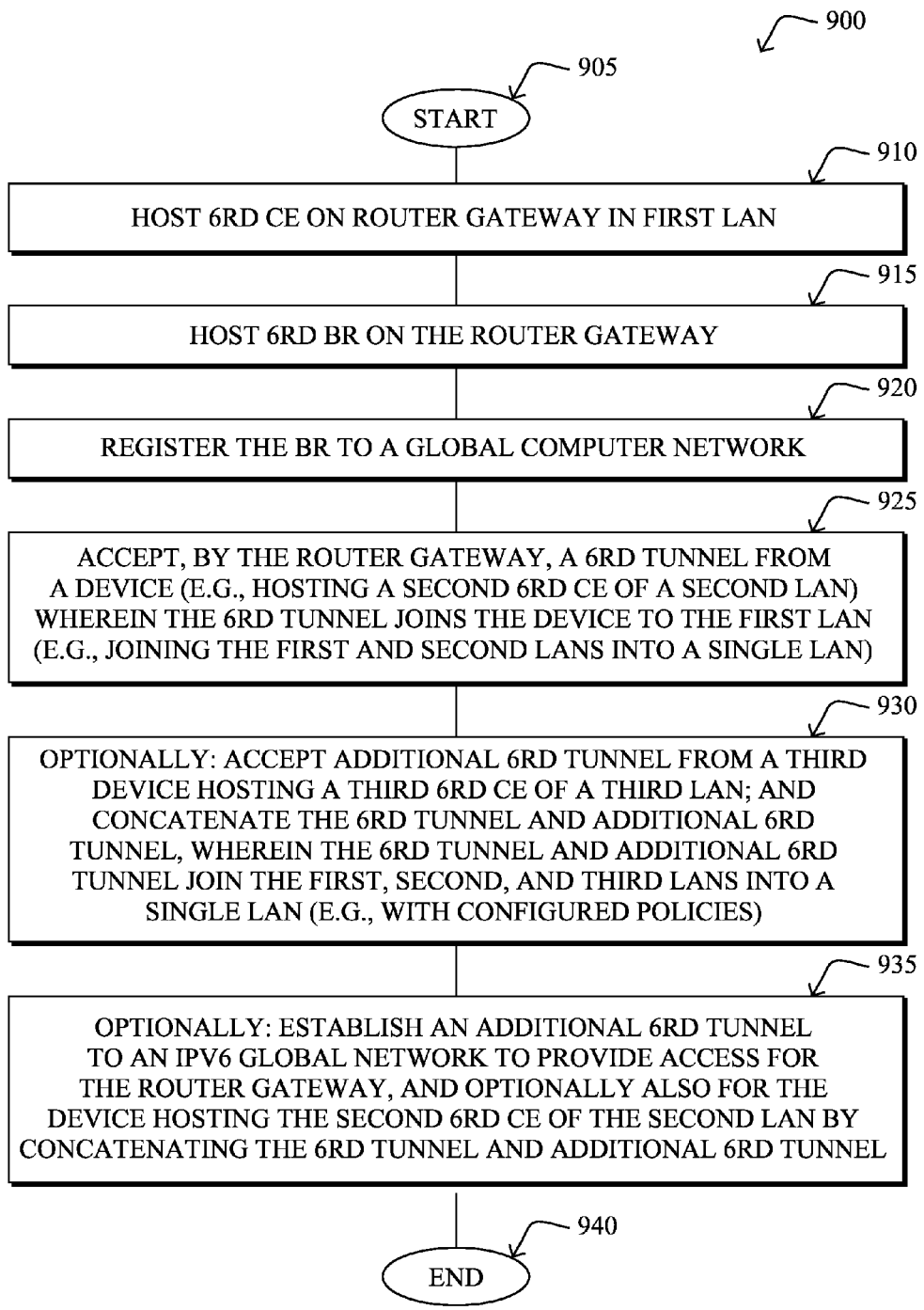
FIGS. 9-10 illustrate example simplified procedures for site-to-site communication in accordance with one or more embodiments herein.

FIG. 9 illustrates an example simplified procedure 900 for site-to-site 6rd tunneling in accordance with one or more embodiments described herein, particularly from the perspective of the CE/BR router gateway 125 in the examples above. The procedure 900 may start at step 905, and continues to step 910 and 915, where, as described in greater detail above, a router gateway 125 hosts both a 6rd CE and 6rd BR in a first LAN (e.g., LAN 2 115). In addition, in step 920, the router gateway 125 registers the relevant BR information to a global computer network as detailed above. Once this information reaches other interested devices, such as CE router gateway 120, then the CE/BR router gateway 125 may accept establishment of a 6rd tunnel 410 from the interested device (e.g., hosting a second 6rd CE of a second LAN, LAN 1) in step 925. In this manner, as described above, the accepted 6rd tunnel joins the device to the first LAN (e.g., joining the first and second LANs into a single LAN).

Optionally, in one or more specific embodiments as noted above, in step 930 the CE/BR router gateway may also accept an additional 6rd tunnel 710 from a third device hosting a third 6rd CE of a third LAN (e.g., LAN 3 715), and may concatenate the 6rd tunnel and additional 6rd tunnel, such that the 6rd tunnel and additional 6rd tunnel join the first, second, and third LANs into a single LAN (e.g., with configured policies). As an additional option as mentioned above, in step 935 the router gateway 125 may is establish an additional 6rd tunnel 510 to an IPv6 global network 140 to provide access for the router gateway, and optionally also for the device hosting the second 6rd CE of the second LAN by concatenating the 6rd tunnel 410 and additional 6rd tunnel 510.

The procedure 900 illustratively ends in step 940, though notably with the ability to establish additional tunnels, register updated information, etc.

Figure 10:
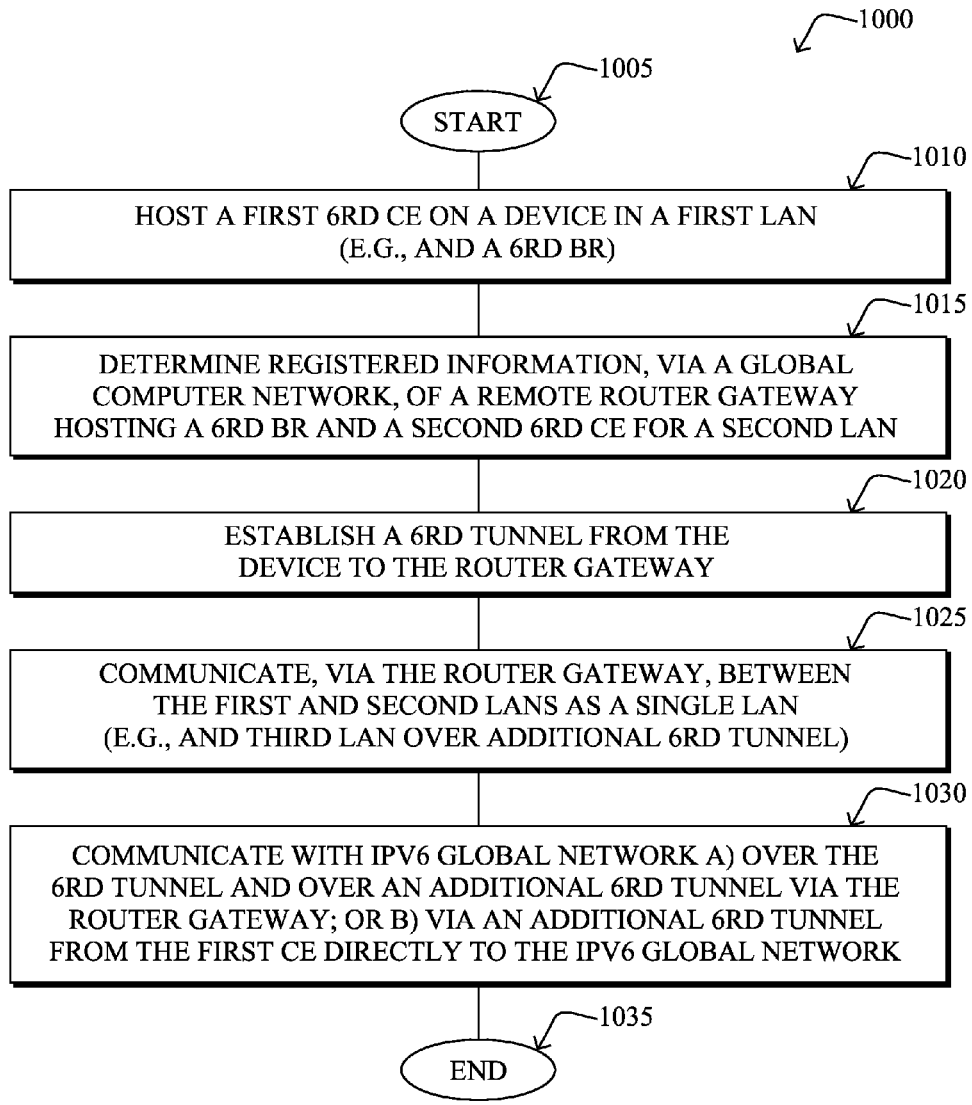

FIG. 10 illustrates an example simplified procedure 1000 for site-to-site 6rd tunneling in accordance with one or more embodiments described herein, particularly from the perspective of the CE router gateway 120 in the examples above. The procedure 1000 may start at step 1005, and continues to step 1010, where, as described in greater detail above, the device (router gateway 120) hosts a 6rd CE (e.g., and optionally another 6rd BR) for a first LAN 1, and may determine in step 1015 various registered information, via a global computer network, of a remote router gateway 125 hosting a 6rd BR and a second 6rd CE for a second LAN 2. As such, if so desired, the router gateway 120 may establish a 6rd tunnel from itself to the CE/BR router gateway 125 in step 1020, and may then communicate, via that 6rd tunnel and the CE/BR router gateway, between the first and second LANs as a single LAN in step 1025.

Note that as described above, in the event of a concatenated 6rd tunnel 710, then communication may also be available with a third LAN 3. In addition, in step 1030 the CE router gateway (or other device) 120 may communicate with the IPv6 global network 140 either A) over the 6rd tunnel 410 and over an additional 6rd tunnel 510 via the CE/BR router gateway 125; or B) via an additional 6rd tunnel 610 from the first CE 120 directly to the IPv6 global network.

The procedure 1000 may illustratively end in step 1135, though notably with the ability to establish additional tunnels, determine updated registered information, communicate using established tunnels, etc.

It should be noted that while certain steps within procedures 900-1000 may be optional as described above, the steps shown in FIGS. 9-10 are merely examples for illustration, and certain other steps may be included or excluded as desired. Further, is while a particular order of the steps is shown, this ordering is merely illustrative, and any suitable arrangement of the steps may be utilized without departing from the scope of the embodiments herein. Moreover, while procedures 900-1000 are described separately, certain steps from each procedure may be incorporated into each other procedure, and the procedures are not meant to be mutually exclusive.

The techniques described herein, therefore, provide for site-to-site 6rd tunneling in a computer network. In particular, the techniques herein provide user-friendly connectivity between two (or more) IPv6 sites over a IPv4 network (e.g., "island-to-island" v6 connectivity over an "ocean" of v4). By locating both the CE and BR function in the router, and using 6rd as a private tunnel between two CPEs, the techniques herein enable the connection of two (or more) remote IPv6 user networks in a manner that extends the originally intended use of 6rd (e.g., to merely bridge the home IPv6 network across the service provider's IPv4 network to the IPv6 Internet, such that the CE and BR functionality would remain separated).

While there have been shown and described illustrative embodiments that provide for site-to-site 6rd tunneling in a computer network, it is to be understood that various other adaptations and modifications may be made within the spirit and scope of the embodiments herein. For example, the embodiments have been shown and described herein with specific relation to 6rd. However, the embodiments in their broader sense are not as limited, and may, in fact, be used with other types of IPv6 transition technologies where the CE/BR incorporate IPv6 and communicate over an IPv4 network. In addition, while certain environments have been described, such as home/family networking (home-to-home), any type of site-to-site environment may be established, such as home-to-work, work-to-work, store-to-store, school-to-school, etc. Also, while the techniques above show only a single router gateway 125 having BR functionality, the router gateway 120 may also host a 6rd BR, such that the established 6rd tunnel 410 may be initiated from either device 120 or 125.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
hosting a first Internet Protocol version 6 (IPv6) Rapid Deployment (6rd) Customer Edge (CE) on a router gateway in a first Local Area Network (LAN);
hosting, on the router gateway, a first 6rd Border Router (BR) to collocate the first 6rd BR and the first 6rd CE on the router gateway for the first LAN; and
accepting, by the router gateway, a 6rd tunnel from a device hosting a second 6rd CE of a second LAN, wherein the 6rd tunnel joins the first and second LANs into a single LAN.

2. The method as in claim 1, further comprising:
accepting, by the router gateway, an additional 6rd tunnel from a third device hosting a third 6rd CE of a third LAN; and
concatenating the 6rd tunnel and additional 6rd tunnel, wherein the 6rd tunnel and additional 6rd tunnel join the first, second, and third LANs into a single LAN.

3. The method as in claim 2, further comprising:
configuring the router gateway with one or more policies regarding pass-through permissions between the second and third LANs.

4. The method as in claim 1, further comprising:
establishing, by the router gateway, an additional 6rd tunnel to an IPv6 global network, wherein the additional 6rd tunnel provides access to the IPv6 global network for the router gateway.

5. The method as in claim 4, further comprising:
concatenating the 6rd tunnel and additional 6rd tunnel, wherein the 6rd tunnel and additional 6rd tunnel provide access to the IPv6 global network for the device hosting the second 6rd CE of the second LAN.

6. The method as in claim 1, further comprising:
accepting, by the router gateway, an additional 6rd tunnel from an additional 6rd device, wherein the additional 6rd tunnel joins the additional 6rd device to the single LAN.

7. The method as in claim 1, further comprising:
registering the BR to a global computer network.

8. The method as in claim 7, wherein registering the BR comprises:
registering a 6rd prefix, 6rd prefix length, 6rd BR Fully Qualified Domain Name (FQDN), and IP version 4 (IPv4) mask length.

9. The method as in claim 1, wherein the device hosting the second 6rd CE of the second LAN hosts a second 6rd BR.

10. A method, comprising:
hosting a first Internet Protocol version 6 (IPv6) Rapid Deployment (6rd) Customer Edge (CE) on a device in a first Local Area Network (LAN);
determining information of a remote router gateway hosting a first 6rd Border Router (BR) that is collocated with the first 6rd CE on the router gateway for the first LAN, and a second 6rd CE for a second LAN;
establishing a 6rd tunnel from the device to the router gateway according to the information; and
communicating, via the router gateway, between the first and second LANs as a single LAN.

11. The method as in claim 10, wherein an additional 6rd tunnel from a third device hosting a third 6rd CE of a third LAN is concatenated with the 6rd tunnel, and wherein the 6rd tunnel and additional 6rd tunnel join the first, second, and third LANs into a single LAN.

12. The method as in claim 10, wherein the router gateway has established an additional 6rd tunnel to an IPv6 global network, the method further comprising:
communicating with the IPv6 global network over the 6rd tunnel and over the additional 6rd tunnel via the router gateway.

13. The method as in claim 10, further comprising:
establishing an additional 6rd tunnel from the first CE to an IPv6 global network.

14. The method as in claim 10, further comprising:
hosting, on the device in the first LAN, a second 6rd BR.

15. The method as in claim 10, further comprising:
determining the registered information via a global computer network.

16. An apparatus, comprising:
one or more network interfaces to communicate as a router gateway within a first Local Area Network (LAN) and a global computer network;
a processor coupled to the network interfaces and adapted to execute one or more processes; and
a memory configured to store a process executable by the processor, the process when executed operable to:
host a first Internet Protocol version 6 (IPv6) Rapid Deployment (6rd) Customer Edge (CE);
host a 6rd Border Router (BR) to collocate the 6rd BR and the second 6rd CE on the router gateway for the first LAN; and
accept a 6rd tunnel from a device hosting a second 6rd CE of a second LAN, wherein the 6rd tunnel joins the first and second LANs into a single LAN.

17. The apparatus as in claim 16, wherein the process when executed is further operable to:
accept a 6rd tunnel from a device hosting a second 6rd CE of a second LAN, wherein the 6rd tunnel joins the first and second LANs into a single LAN.

18. The apparatus as in claim 17, wherein the process when executed is further operable to:
accept an additional 6rd tunnel from a third device hosting a third 6rd CE of a third LAN; and
concatenate the 6rd tunnel and additional 6rd tunnel, wherein the 6rd tunnel and additional 6rd tunnel join the first, second, and third LANs into a single LAN.

19. The apparatus as in claim 17, wherein the process when executed is further operable to:
establish an additional 6rd tunnel to an IPv6 global network, wherein the additional 6rd tunnel provides access to the IPv6 global network for the router gateway; and
concatenate the 6rd tunnel and additional 6rd tunnel, wherein the 6rd tunnel and additional 6rd tunnel provide access to the IPv6 global network for the device hosting the second 6rd CE of the second LAN.

20. An apparatus, comprising:
one or more network interfaces to communicate as a device within a first Local Area Network (LAN);
a processor coupled to the network interfaces and adapted to execute one or more processes; and
a memory configured to store a process executable by the processor, the process when executed operable to:
host a first Internet Protocol version 6 (IPv6) Rapid Deployment (6rd) Customer Edge (CE) in the first LAN;
determine information of a remote router gateway hosting a 6rd Border Router (BR) that is collocated with the first 6rd CE on the router gateway for the first LAN, and a second 6rd CE for a second LAN;
establish a 6rd tunnel from the device to the router gateway according to the information; and
communicate, via the router gateway, between the first and second LANs as a single LAN.

21. The apparatus as in claim 20, wherein an additional 6rd tunnel from a third device hosting a third 6rd CE of a third LAN is concatenated with the 6rd tunnel, and wherein the 6rd tunnel and additional 6rd tunnel join the first, second, and third LANs into a single LAN.

22. The apparatus as in claim 20, wherein an additional 6rd tunnel from the router gateway to an IPv6 global network is concatenated with the 6rd tunnel, and wherein the process when executed is further operable to:
communicate with the IPv6 global network over the 6rd tunnel and over the additional 6rd tunnel via the router gateway.

* * * * *